(12) United States Patent
Webster et al.

(10) Patent No.: US 8,490,540 B2
(45) Date of Patent: Jul. 23, 2013

(54) PROGRAMMABLE BREWER

(75) Inventors: Joseph P. Webster, St. Charles, MO (US); Jody G. Jacobsen, Defiance, MO (US)

(73) Assignee: Newco Enterprises, Inc., St. Charles, MO (US)

( * ) Notice: Subject to any disclaimer, the term of this patent is extended or adjusted under 35 U.S.C. 154(b) by 1469 days.

(21) Appl. No.: 12/152,592

(22) Filed: May 15, 2008

(65) Prior Publication Data

US 2008/0282897 A1 Nov. 20, 2008

Related U.S. Application Data

(60) Provisional application No. 60/930,470, filed on May 16, 2007.

(51) Int. Cl.
*A47J 31/40* (2006.01)

(52) U.S. Cl.
USPC ............................................................ 99/280

(58) Field of Classification Search
USPC ............................................ 99/280, 286, 279
See application file for complete search history.

(56) References Cited

U.S. PATENT DOCUMENTS

| | | | |
|---|---|---|---|
| D209,125 S | 10/1967 | Martin | D7/309 |
| 3,385,201 A | 5/1968 | Martin | 99/282 |
| D229,158 S | 11/1973 | Marotta | D7/309 |
| 3,978,778 A | 9/1976 | Roberts | 99/281 |
| D243,501 S | 3/1977 | Painter | D7/309 |
| 4,069,750 A | 1/1978 | Kemp | 99/280 |
| D253,987 S | 1/1980 | Painter | D7/309 |
| 4,218,965 A | 8/1980 | Petry | 99/283 |
| D269,488 S | 6/1983 | Marotta | D7/309 |
| D274,029 S | 5/1984 | Daugherty | D7/309 |
| 4,478,139 A | 10/1984 | Zimmerman | 99/280 |
| D288,887 S | 3/1987 | Schultz, Sr. | D7/309 |
| 4,725,714 A | 2/1988 | Naya et al. | 392/480 |
| D298,996 S | 12/1988 | Van Camp et al. | D7/309 |
| 4,829,888 A | 5/1989 | Webster et al. | 99/284 |
| 4,892,031 A | 1/1990 | Webster et al. | 99/284 |
| 4,917,005 A | 4/1990 | Knepler | 99/280 |
| D316,795 S | 5/1991 | Brewer | D7/308 |
| 5,063,836 A | 11/1991 | Patel | 99/281 |
| 5,916,351 A | 6/1999 | Sintchak | 99/284 |
| D432,861 S | 10/2000 | Lord et al. | D7/397 |
| D454,023 S | 3/2002 | Wang | D7/309 |
| D481,902 S | 11/2003 | O'Connor et al. | D7/309 |
| D484,734 S | 1/2004 | Drobeck | D7/309 |
| D496,213 S | 9/2004 | Midden et al. | D7/309 |
| D502,841 S | 3/2005 | Santer | D7/379 |

*Primary Examiner* — Raeann Gorden
(74) *Attorney, Agent, or Firm* — Paul M Denk

(57) ABSTRACT

A programmable brewer capable of brewing approximately 250 different brewing profiles for beverages, including a housing, having a base, the base capable of supporting a decanter, into which the brewed beverage is deposited. A cover is cantilevered forwardly at the top of the housing, and the housing incorporates a water tank capable of producing heating water for use of brewing purposes. The brewer cooperating with a hand held computer for producing limited programming functions available through the brewer during its usage, said computer providing for a calibration of the programming mode, to determine the parameters of a brewing cycle, regulating the temperature of the water, and a computer providing for establishing the operation mode of a cold water dispensing tube, and a hot water dispensing tube for determining the amount of water to be dispensed from said tubes during operations of a brew cycle.

23 Claims, 15 Drawing Sheets

PROGRAMMABLE BREWER

CROSS REFERENCE

This application is a nonprovisional patent application which claims priority to patent application having Ser. No. 60/930,470 filed on May 16, 2007.

FIELD OF INVENTION

This invention relates to a beverage brewing apparatus, and more specifically to a brewing apparatus that may be programmable to provide for the specific type of a myriad of beverages to be brewed therefrom upon selection.

BACKGROUND OF INVENTION

Numerous brewing apparatuses have long been available for many, many years, generally commencing back around the 1950's, when the automation of brewing primarily for use in commercial brewers, was given consideration, and developed, to facilitate the preparation of primarily coffee, at commercial establishments such as restaurants, hotels, and the like. These types of brewers generally utilized a large tank, into which cold water was deposited, and when heated, the hot water rose within the brewing tank, to provide for a siphoning action of the heated hot water to be dispensed into a spray head for deposit upon coffee grounds, for brewing of this type of beverage. Many of these mechanical types of brewers have long been available in the art, and most of them operate off the same principle, but utilize different mechanical features for enhancing either the operations of the heating tank, the spray head, the basket, and the means for mounting the basket within the brewer, and related types of improvements.

SUMMARY OF THE INVENTION

This invention relates primarily to beverage brewing, and more specifically to a programmable brewer that can be preset to provide for a selection of a multitude of brewed beverages, of various types, flavors, strengths, and even dispensed from manual brewing, or automatic brewing, of a variety of beverages. More specifically, the brewer of this invention includes the hot water tank, with its integrated base, and a cantilever spray head, that furnishes the usual format for brewing of variety of beverages, whether it be coffee, tea, hot chocolate, or the like. The brewer further is programmable, so as to provide for onboard programming instructions, that can be initiated through switch selections, that furnishes programming of the calibration of the various water flow rates, the power mode selection, the maximum temperature set points, and a variety of intensities and concentrations of beverages to be brewed, whether it be the usual coffee, tea, hot chocolate, or other type beverages. Essentially, the concept further includes a dispensing of hot water, that may be used for the auxiliary processing and delivery to make hot chocolate, depending upon the desires and selection of the consumer.

The brewer of this invention can be calibrated insitu, at the factory, but that the various adjustments to the particular parameters of the brewer may be done upon installation, that may determine the precise volume of water that is to be delivered by the brewer, within a specific time frame, and from its various points of delivery of the hot water, as determined from the programmed parameters of the brewer, and the various recipes that are programmed into it, to produce precise beverages at the consumers' selections.

The brewer includes conveniently exposed controls, that may be manipulated by the user, in the form of a switch plate, and various selection buttons, and in addition, furnishes other controls, conveniently located, to assure that once the brewer is programmed, and its various parameters are established within its computer controls, the brewer will function to repeatedly produce a high quality of beverage, at the selection of the user, to the amount and strength as desired, repeatedly during usage and application.

It is, therefore, the principal object of this invention to provide a programmable beverage brewer that will function highly efficiently, for a sustained period of time, to produce quality beverage at the consumers' selection.

It is yet another object of this invention to provide a commercial programmable brewer that can be easily operated, by the facilities workers, in which the brewer of this invention is installed.

Still another object of this invention is to provide a programmable beverage brewer that can continuously provide a precisely brewed beverage to the quantity, strength, and selection, of the user.

Still another object of this invention is to provide a brewer that incorporates a lateral faucet, from which hot water may be dispensed, as when cooking peripheral beverages, such as hot chocolate.

Still another object of this invention is to provide a supplemental faucet, that may deliver cooler water, when the user desires to add cold water dilution to a brewed cup or decanter of coffee, or the like.

Still another object of this invention is to provide a programmable beverage brewer wherein its electronic component control board is integrated within the structure of the housing.

These and other objects may become more apparent to those skilled in the art upon review of the summary of the invention as provided herein, and upon undertaking a study of the description of its preferred embodiment, in view of the drawings.

PARTS LIST

| Ref. No. | Description |
| --- | --- |
| 1 | Tank assembly w/lid, 1650/6600 W |
| 2 | Tank lid assembly, 1650/6600 W |
| 3 | Tank only |
| 4 | Tank lid, spotweld assembly |
| 5 | Element, 165/6600, ring terminals |
| 6 | Nut, ½-20 brass jam |
| 7 | Gasket, plated brass, 520 ID |
| 8 | Thermostat, limit, DPST, 40 A |
| 9 | Theristor, dual, 7⁵⁄₁₆" |
| 10 | Water flow tube |
| 11 | Probe assembly, 1⁷⁄₁₆" |
| 12 | Probe assembly, 2" |
| 13 | Tube fitting assembly |
| 14 | Washer, .451 ID × .750 OD, S/S |
| 15 | Nut, ⁷⁄₁₆-20, S/S |
| 16 | Elbow, male ¼ comp × ⅛ NPT |
| 17 | Gasket, ⅜ ID × ¾ OD, .075 TH |
| 18 | Bulkhead, faucet outlet |
| 19 | Gasket, plated brass, .566 ID |
| 20 | Grommet, silicone, no slit |
| | Other Plumbing |
| 21 | Valve, solenoid, dump NC |
| 22 | Valve, solenoid, dump NC, 180 |
| 23 | Valve assembly, fill/cold dilution |
| 24 | Nut, fill valve |
| 25 | Gasket, fill valve |
| 26 | PDS flow control assembly |
| 27 | Fitting, bulkhead, faucet/dilution |
| 28 | Tube assembly, faucet, w/handle |
| 29 | Tube, cold dilution |
| 30 | Elbow, ⅜ stem × ¼ tube, PP |
| 31 | Elbow, ⅜ union, cut short |
| 32 | Tube, ¼" S/S, valve to dilution |
| 33 | Tube, ¼" S/S valve to tank fill |
| 34 | Sprayhead, RD for dump, NH |
| 35 | Insert, flow restrictor |
| 36 | Tubing, silicone, ⅛ ID × ¼ OD |
| 37 | Tubing, silicone, ⅜ ID × ⅝ OD |
| 38 | Plug, ⅜ barbed, PP |
| 39 | Hose clamp, .574 Dia |
| | Other Parts |
| 40 | Lid, tea urn, S/S |
| 41 | Control board assembly, in box |
| 42 | Control board w/IR board |
| 43 | IR board |
| 44 | Panel with inserts, wave switch |
| 45 | Label, switchplates |
| 46 | Panel assembly, heater power |
| 47 | Heatsink 4.6 × 2.4 × 1.5 |

-continued

PARTS LIST

| Ref. No. | Description |
| --- | --- |
| 48 | Triac, 40 Amp |
| 49 | Switch, DP/ST, rocker |
| 50 | Transformer, 120 V prim, 24 V CT, 40 VA |
| 51 | Sensor assembly, vessel detect |
| 52 | Switch assy, micro DC3 w/o 2 pole conn. |
| 53 | Bracket, basket detection switch |
| 54 | Terminal block |
| 55 | Label, terminal block |
| 56 | Power cord assembly, 15 A |
| 57 | Grommet, strain relief |
| 58 | Plate, cord |
| 59 | Bushing, 1⅛ Snap |
| | Cabinet and Miscellaneous |
| 60 | Cover assembly, brewer top |
| 61 | Panel w/inserts, LH side |
| 62 | Panel w/inserts, RH side |
| 63 | Panel, no inserts, as molded universal side |
| 64 | Insert, brass 6-32 w/ flange |
| 65 | Base assembly |
| 66 | base, as molded |
| 67 | Insert, brass 8-32 |
| 68 | Channel, RH leg |
| 69 | Channel, LH leg |
| 70 | Foot, screw on |
| 71 | Rail, RH brew nail |
| 72 | Rail LH brew nail |
| 73 | Panel, (wave), front main access |
| 74 | Bolt, ¼-20 × 1¼, S/S |
| 75 | Washer, ¼" split lock |
| 76 | Washer, .218 ID × .562 OD SS |
| | Brew Basket |
| 77 | Basket assembly, S/S coffee |
| 78 | Vacuum breaker assembly |
| 79 | Nut, ⅜-32 jam |
| 80 | O-ring, .375 ID × .500 OD |

DESCRIPTION OF THE PREFERRED EMBODIMENT

Figure 1:
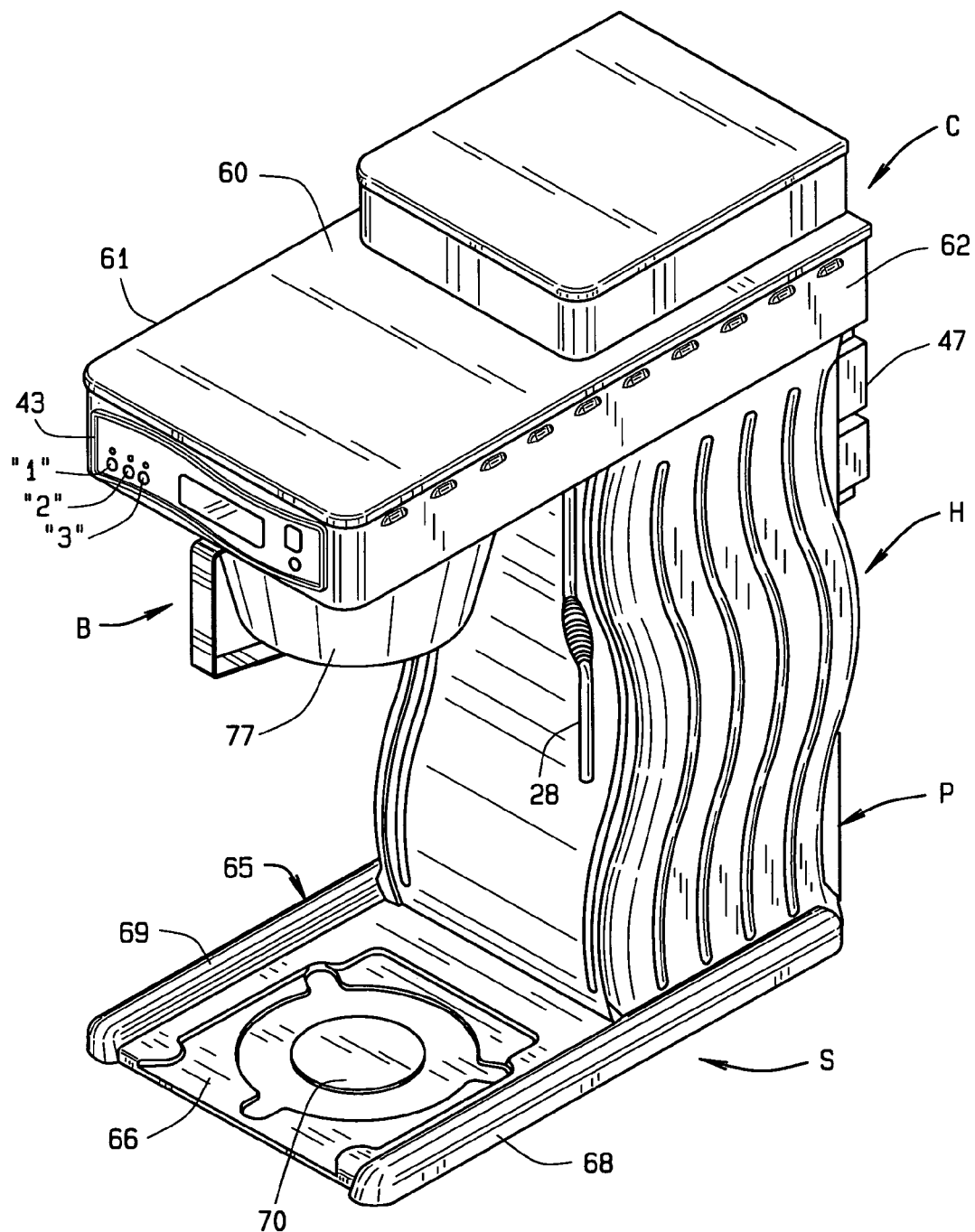
FIG. 1 is a an isometric view of the programmable brewer of this invention.
Figures 2, 3:
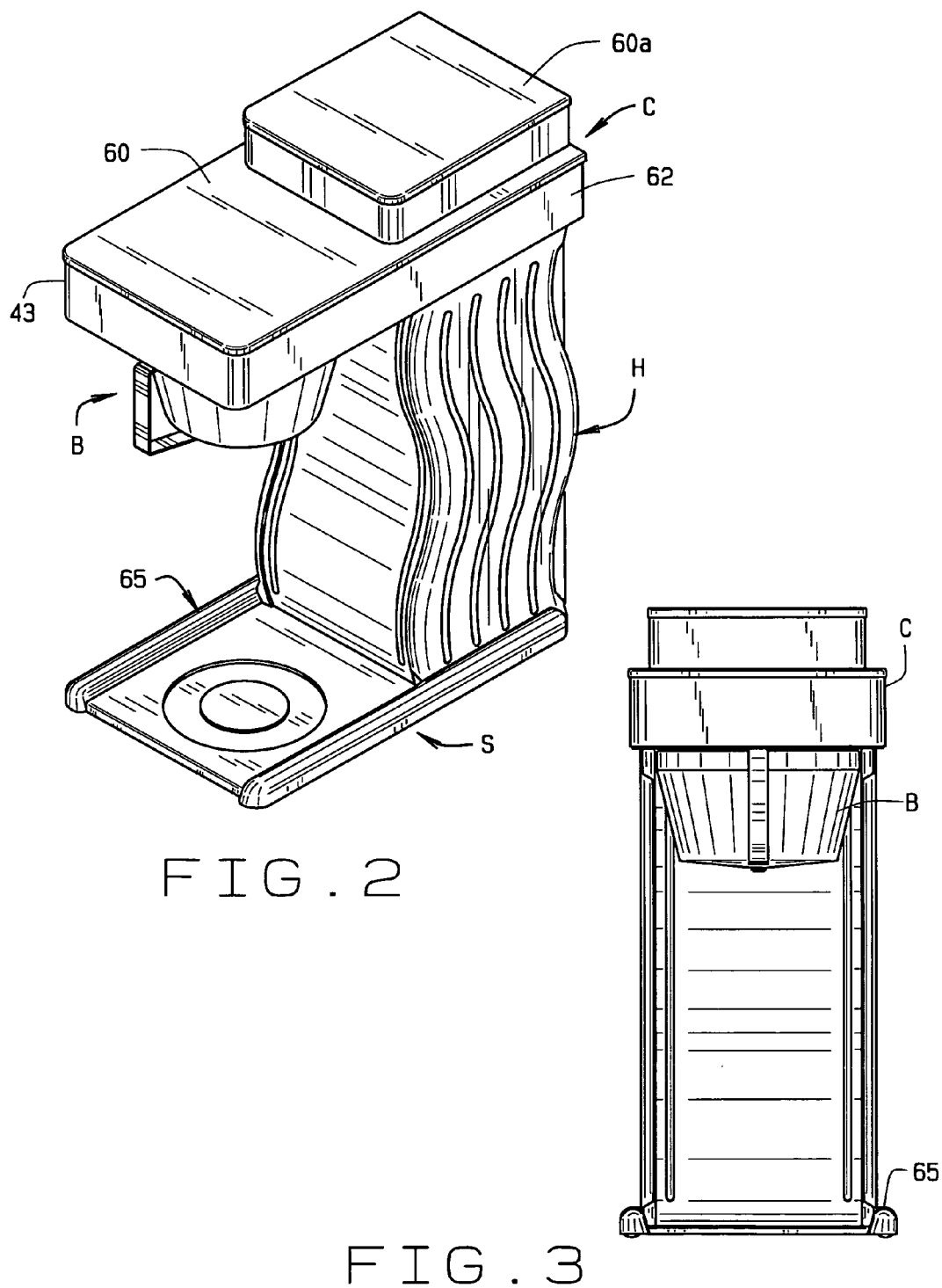
FIG. 2 is an isometric view of a modified programmable brewer of this invention.
FIG. 3 is a front view thereof.
Figure 4:
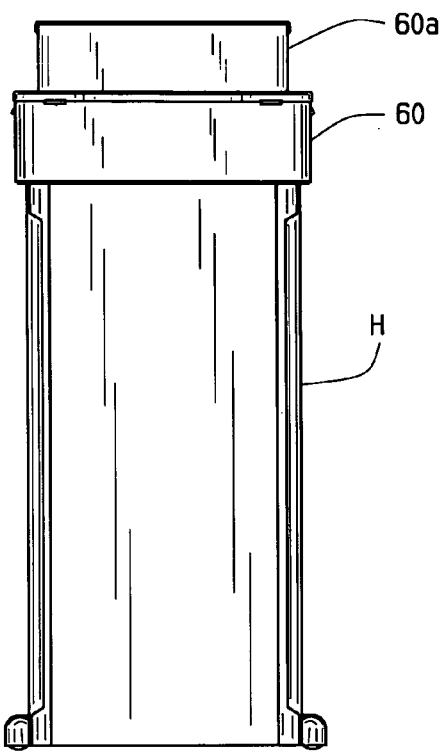
FIG. 4 is a rear view thereof.
Figure 5:
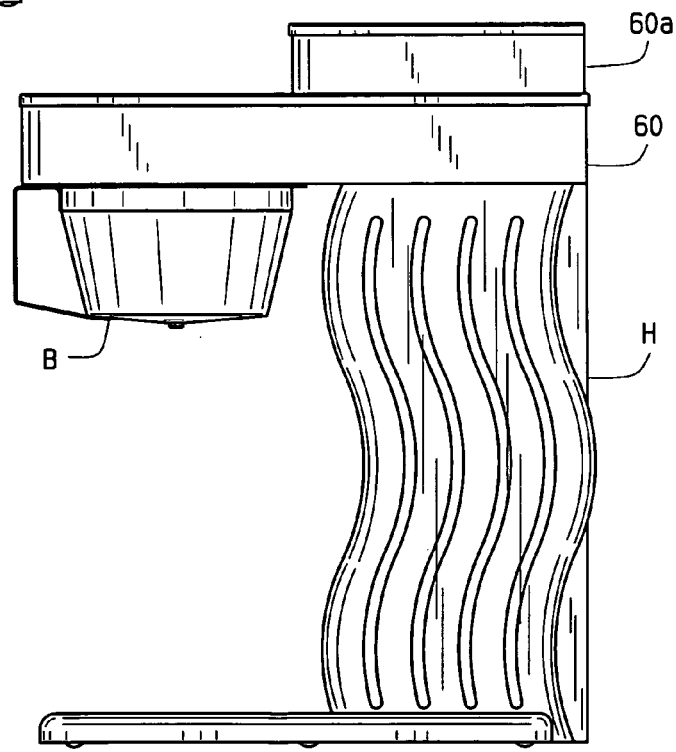
FIG. 5 is a side view.
Figure 6:
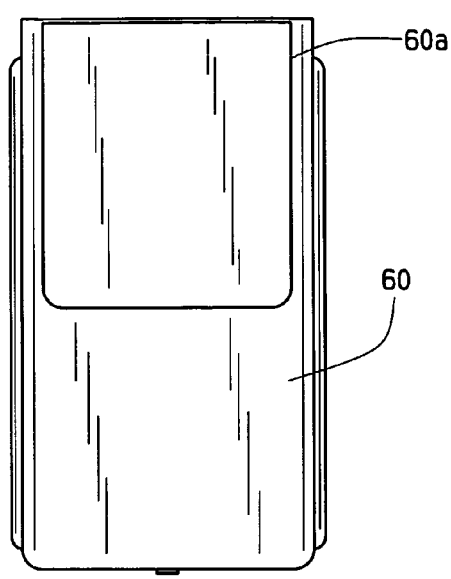
FIG. 6 is a top view.
Figure 7:
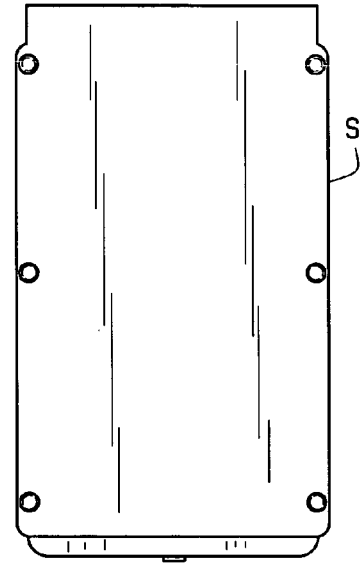
FIG. 7 is a bottom view.
Figure 8:
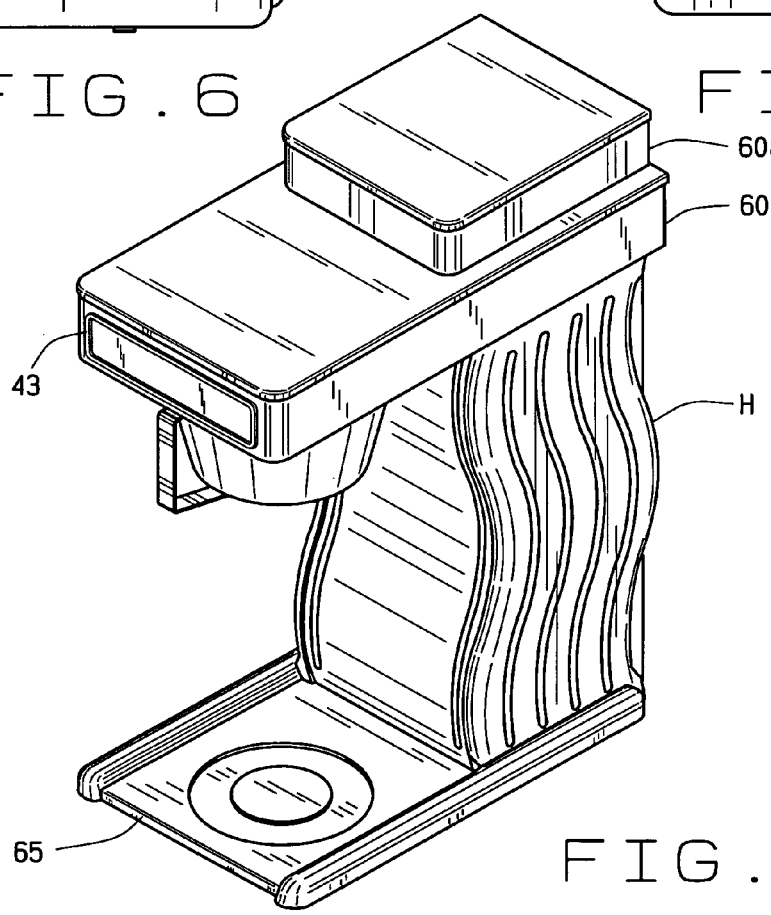
FIG. 8 is an isometric view of a slightly modified brewer of this invention, showing a forwardly disposed conveniently placed control panel.
Figures 9, 10:
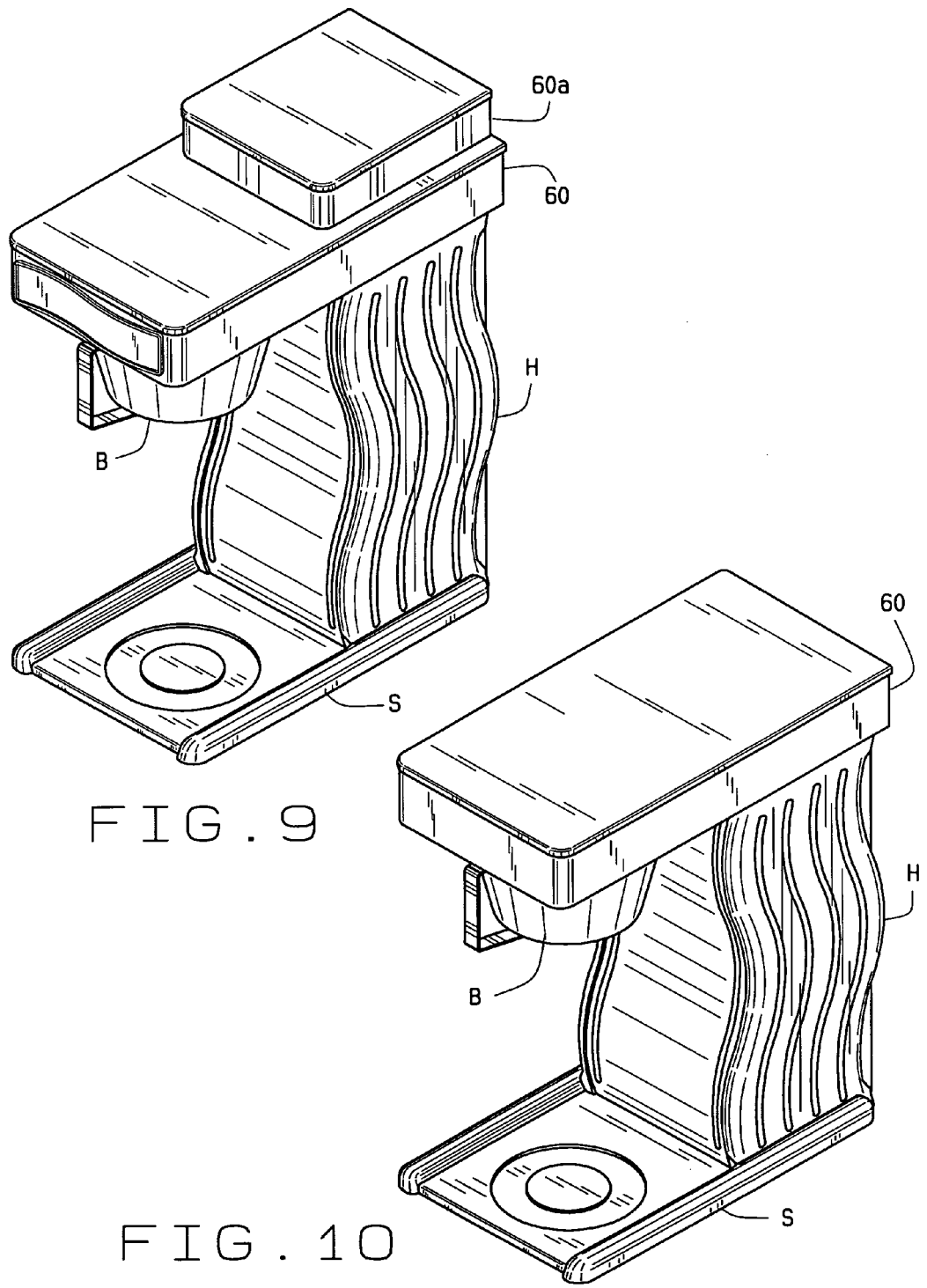
FIG. 9 is an isometric view of a further modified programmable brewer.
FIG. 10 is an isometric view of a further modified programmable brewer.
Figure 11:
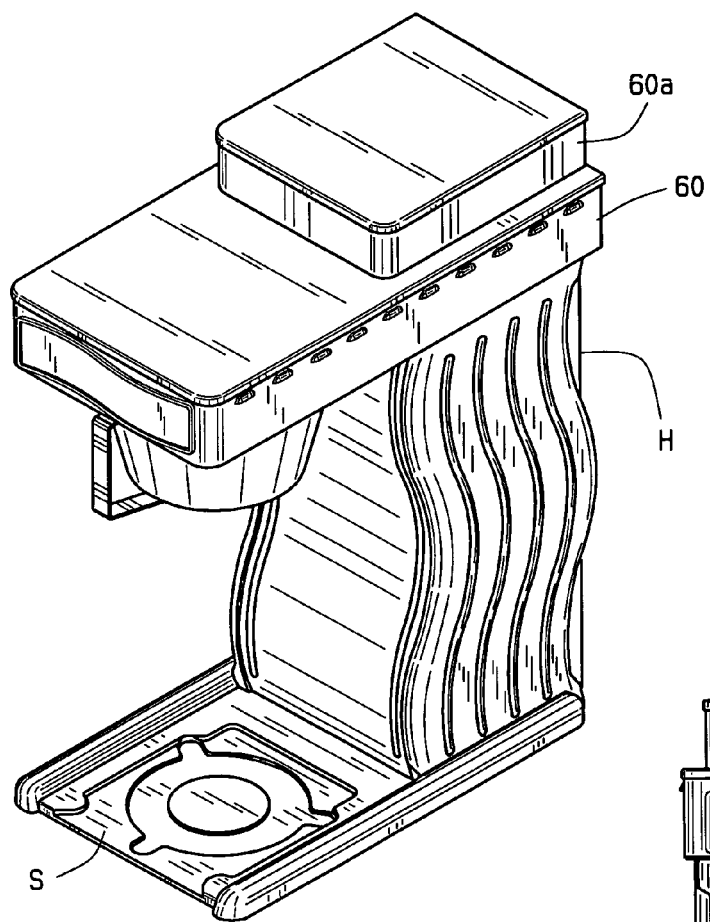
FIG. 11 is an isometric view of a further modified programmable brewer.
Figure 12:
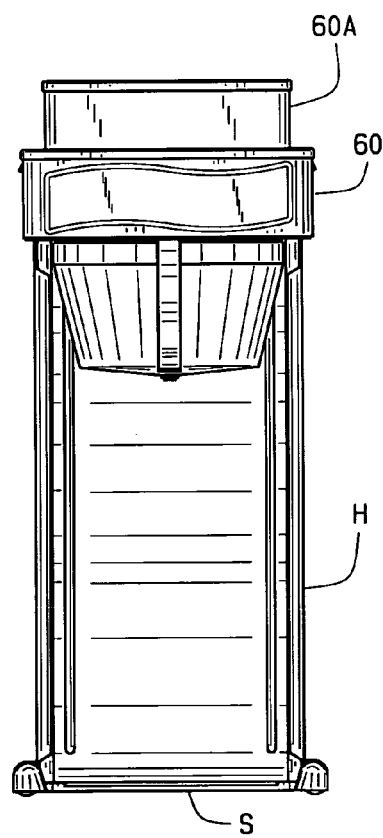
FIG. 12 is a front view.
Figure 13:
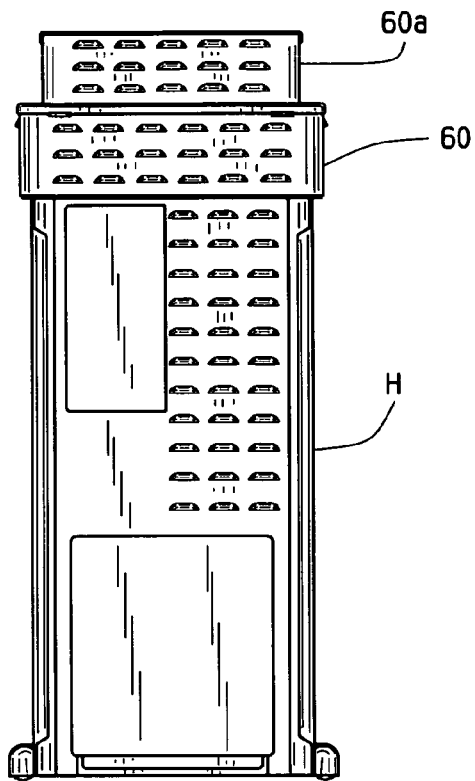
FIG. 13 is a rear view.
Figure 14:
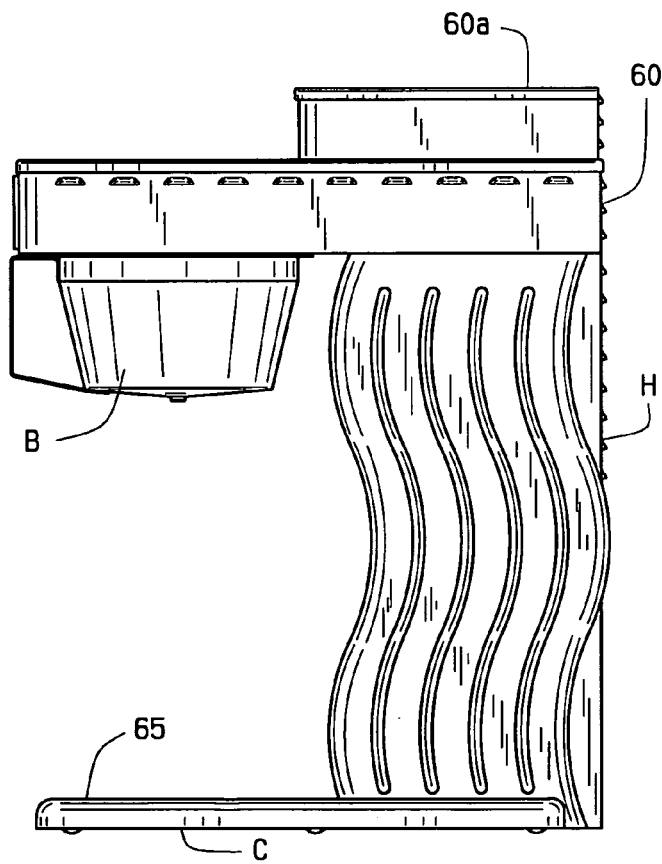
FIG. 14 is a right side view.
Figure 15:
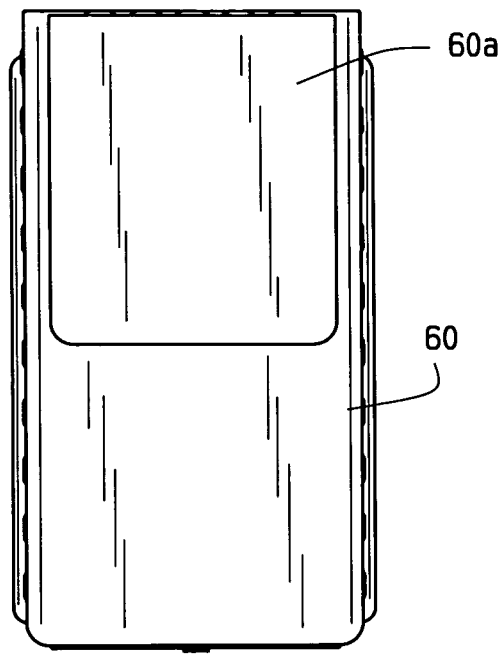
FIG. 15 is a top view.
Figure 16:
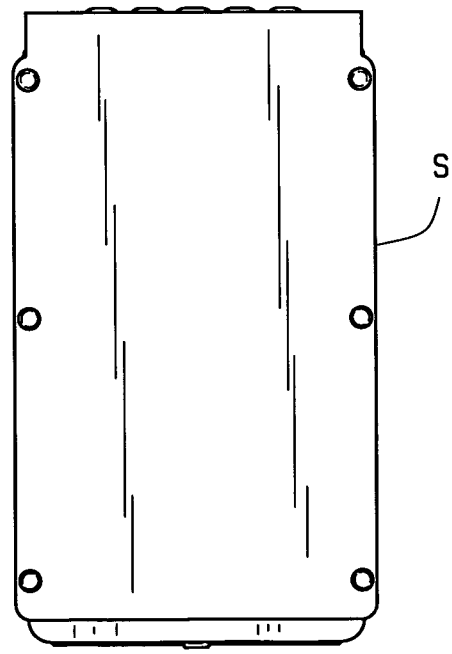
FIG. 16 is a bottom view.
Figure 17:
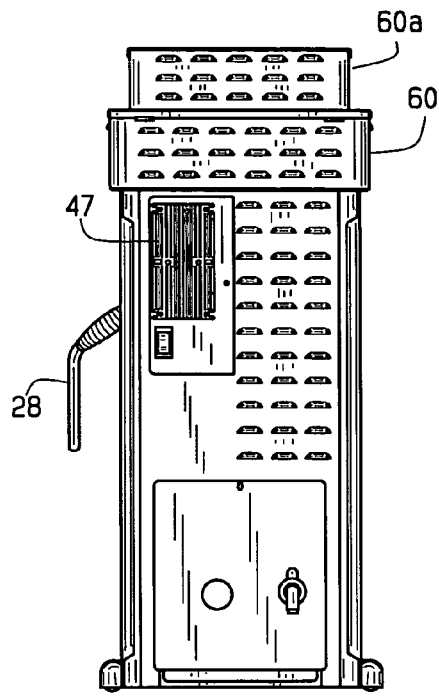
FIG. 17 is a rear view of a modified programmable brewer.

In referring to the drawings, and by way of example in viewing the brewer as shown if FIG. 1, in addition to its modifications as shown in FIGS. 2, 8, 9, 10, and 11, generally, the brewer of this invention includes a housing H, having a cover assembly C provided mounted onto the housing, and extending in cantilevered fashion forwardly, for holding a brew basket B, during usage. A support base S is integrated into the housing at its bottom and extends forwardly, for supporting a decanter or beaker (not shown) where the brewed beverage is deposited, during usage. There is also a back panel T that is provided, for furnishing closure to the backend of the housing, as during installation.

Figure 20:
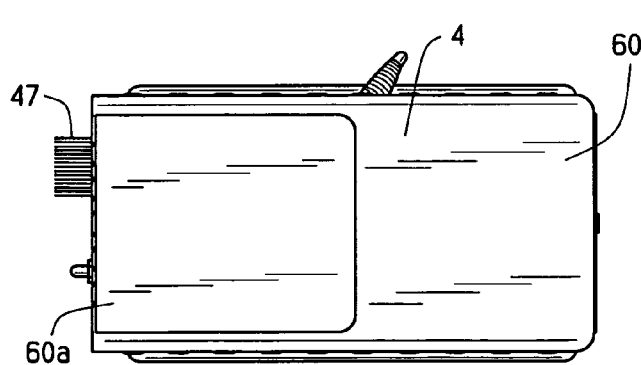
FIG. 20 is a top view.

The more specific components for the structure of this beverage brewer will be hereinafter described. In referring to FIG. 24, a tank assembly 1 is provided within the housing, located under its tank lid assembly 2, which provides support for select of the operative components, in addition to the water flow lines, required for routine operations of the brewer. The tank is generally shown extending downwardly, as at 3, and is located within the housing, rearwardly of the brewer, as known in the trade. A tank lid 4, as can be seen in FIG. 20, is provided for closure to this upper region of the brewer, when the lid is generally affixed to the upper flanges 100, integrally formed along the upper edges of the housing H.

As previously stated, the various control elements, as at 5, that are mounted upon the assembly 2, as previously referred to. Various fasteners, such as the nut 6 are provided for securing the assembly in place, when the brewer is constructed. Any type of gasket material, such as a plated brass gasket 7 can be used, to assure that the assembly remains in place, and is not displaced, particularly after prolonged exposure to the heat of the operating brewer, since the heating water tank 3 is located just below thereof, during usage. A thermostat 8 is provided upon the lid assembly, and furnishes control to the operations of the device, from a heat standpoint, since this is a limit thermostat that may also shutoff the operations of the brewer, in the event that excessive heat is encountered. A dual thermistor (temp sensor) 9 is also provided, for determining temperature limits within the tank, as the water is being heated, to assure that proper temperature control is maintained during a brewing cycle, and while the water is being heated within the tank during usage. As can be noted, various types of probes, identified as the probe assembles 11 and 12, are provided, for extending their probe down into the water tank, in order to furnish an accurate gauge as to the water levels within the tank, and the temperatures being generated, during a brewing cycle. A tube fitting assembly 13 is provided, and provides for the connection of the water flow tube 10, that may deliver water to the spray head of the brewer, as will be subsequently described. Various washers and fasteners may be provided for assuring that the tube fitting assembly furnishes a water tight seal, at the location where it extends into the water tank, during installation and usage. A bulk head is furnished at 18, that connects with the water tank, that provides a delivery of water to a faucet or other outlet, provided at the front of the brewer.

At the front of the brewer, within its cantilever cover C, is a valve solenoid 21, that controls the delivery of fluid within the upper segment of the brewer, during functioning. This is a dump drain that allows for removal of any excess brewed beverage, as a bypass. A similar type of solenoid valve, that functions as a brewing cycle valve, is provided at 22.

Figure 23:
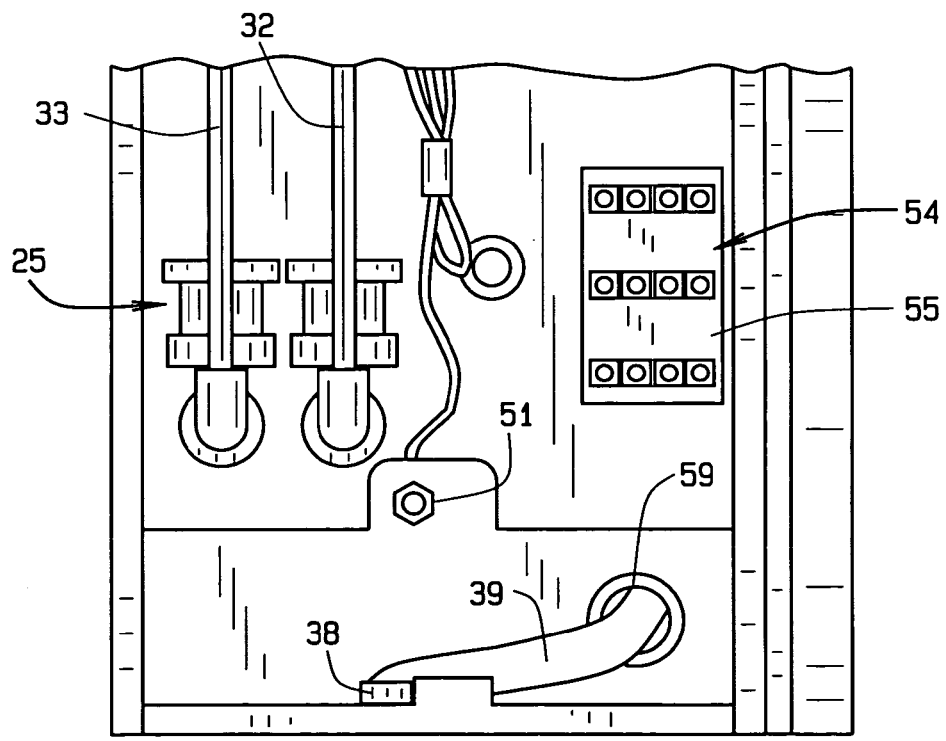
FIG. 23 is a front view of the lower portion of the brewer with the front panel removed.
Figure 26:
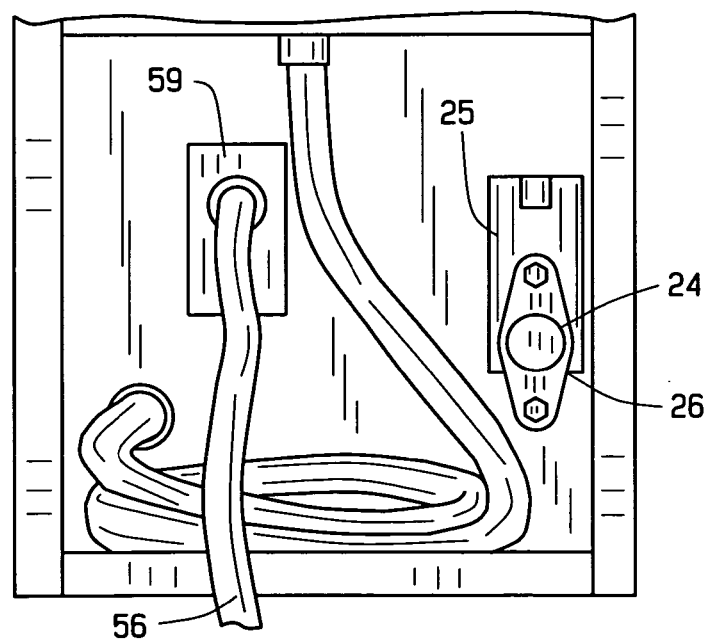
FIG. 26 is a further back view of the brewer.

As can be seen in FIG. 23, the valve assembly that provides for filling of the tank with cold water, or which furnishes a cold dilution to a brewed beverage, is controlled through this valve 23. At 24, as noted in FIG. 26, is the incoming water fill valve that is provided for also filling the tank assembly. At 25 there is also provided a gasket that provides a fluidic seal for the filled valve. At 26 is the PDS flow control regulator assembly for the cold water inlet.

Figure 18:
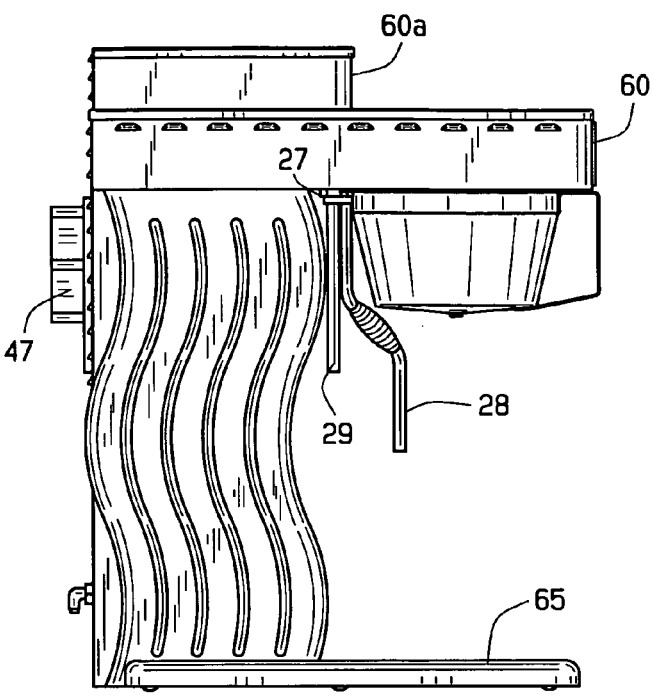
FIG. 18 is a left side view.
Figure 19:
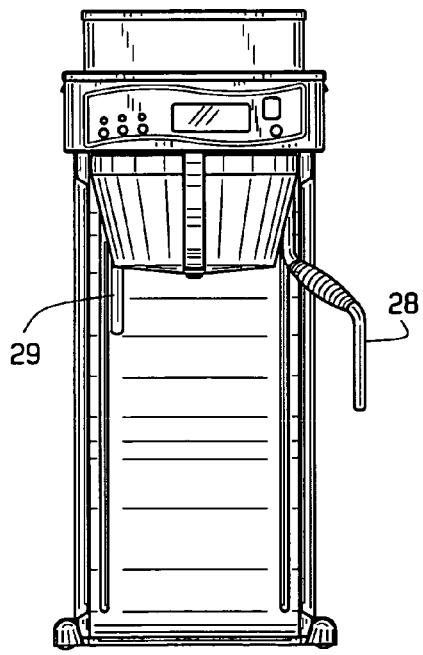
FIG. 19 is a front view.
Figure 21:
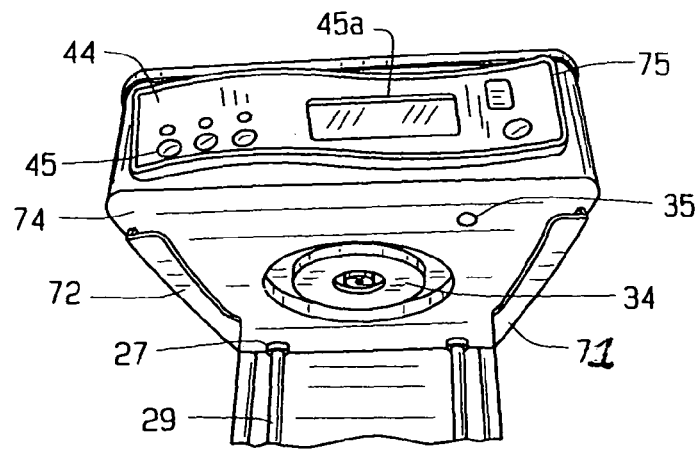
FIG. 21 is a partial view looking upwardly at the location where the brew basket is installed in place during a brewing cycle.

In referring to FIG. 21, the fitting and bulk head faucet for delivery of cold for dilution purposes can be noted at 27. This cold water faucet for delivering cold water for dilution purposes can also be seen in FIG. 18. A tube assembly faucet with handle can be noted at 28, and is provided for delivery of hot water extraneously, such as when one may desire to brew a cup of hot chocolate, or related beverage. The tube that delivers the cold water for dilution purposes is noted at 29. Both of the cold water dilution and the hot water tube 28 are conveniently provided laterally at the front of the housing, for the convenience of use by the user.

At 32 and 33, respectively, in FIG. 23, are the tubes that connect with the valve assemblies, as noted, that deliver water to the cold water dilution tube 29, or provides the valve and tube for conveyance of cold water to the fill tank, with respect to the tube 33.

Figure 24:
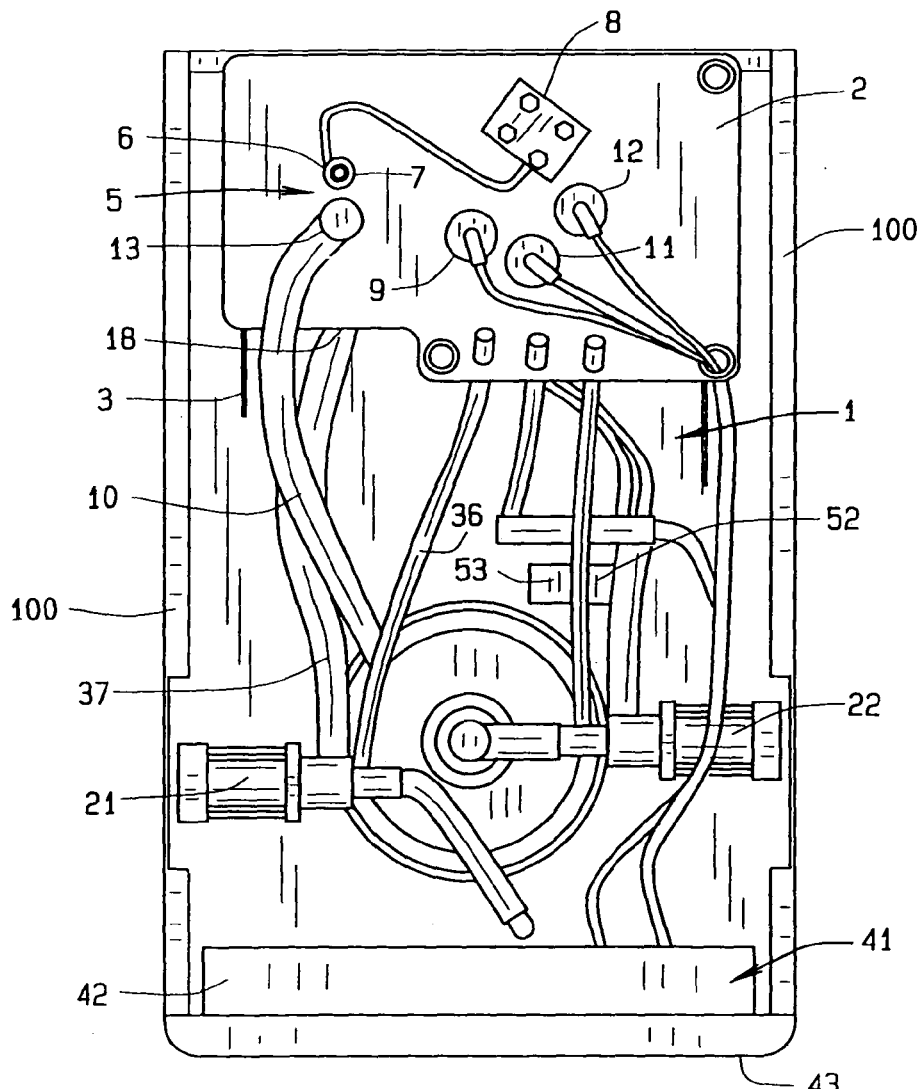
FIG. 24 is a top of the brewer with the top panel removed.

Referring once again to FIG. 21, the outlet for the heated water is provided at the spray head 34, and there is also provided an insert that controls and functions as a flow restrictor, as noted at 35. As can be seen in FIG. 24, tubing, as at 36, provides for the transference of water, which allows water to drain from the apparatus. In addition, the tubing 38 furnishes similar means for conveyance of water during operations of the device. As noted in FIG. 23, a drain plug is provided at 38, and it provides for support of the drain tube 39 therethrough.

At the upper front of the cover C, interiorly of its face plate 43, is the control board assembly 41, that regulates the controls of the brewer, when instructions are provided through the manipulation of various of the buttons, provided at the front of said cover, as at said 43. See FIG. 24. In addition, as can be noted in FIG. 21, all the various brewing profiles, and other data that is calculated and displayed from the programming of the computer for the brewer, is displayed at the screen 45a, as can be noted. The types of controls as utilized can also be seen in the various isometric figures, such as FIG. 1. In addition, integrated into the control board assembly is the control board with/IR board as at 42, which furnishes accurate control when instructions are delivered through the keyboard, at the front of the brewer cover. As can also be noted in FIG. 21, in order to add to the decorativeness of the brewer, its front panel may be formed as a wave configured switch, as at 44. As previously reviewed, the various switch plates, or the buttons that control the instructions from the user, are provided at 45, and these are generally numbered as switch number "1", "2", or "3".

Figure 25:
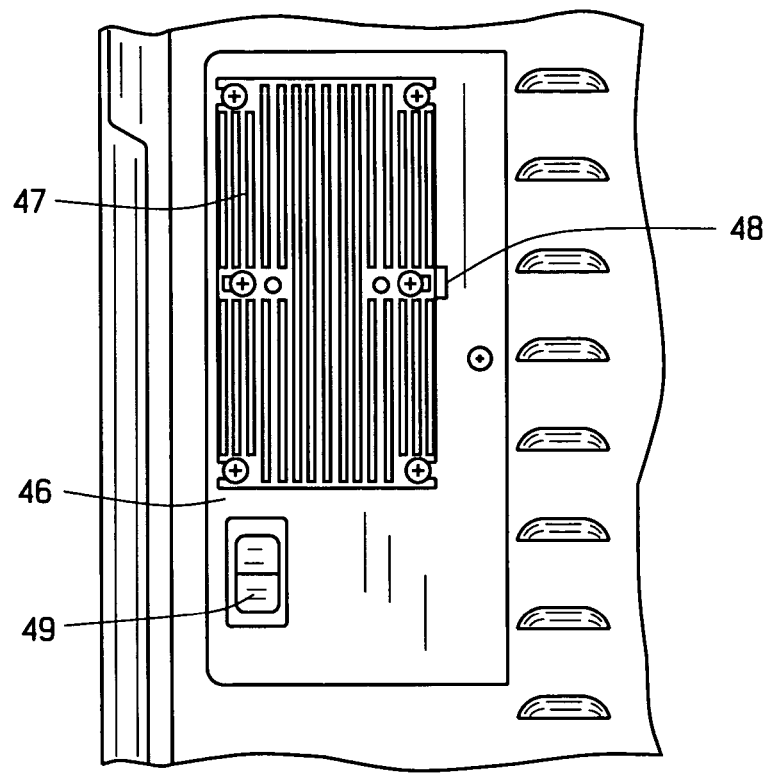
FIG. 25 discloses the back of the brewer with its heatsink in place.

At the back of the unit, as can be seen in FIG. 25, is the panel assembly heater power 46, which mounts a heat sink 47, which further includes a triac, at 40 amps, as at 48, for heat dissipation purposes. A switch 49, the operations of which will be subsequently described, is a double pole, single throw, rocker type of switch.

Figure 22:
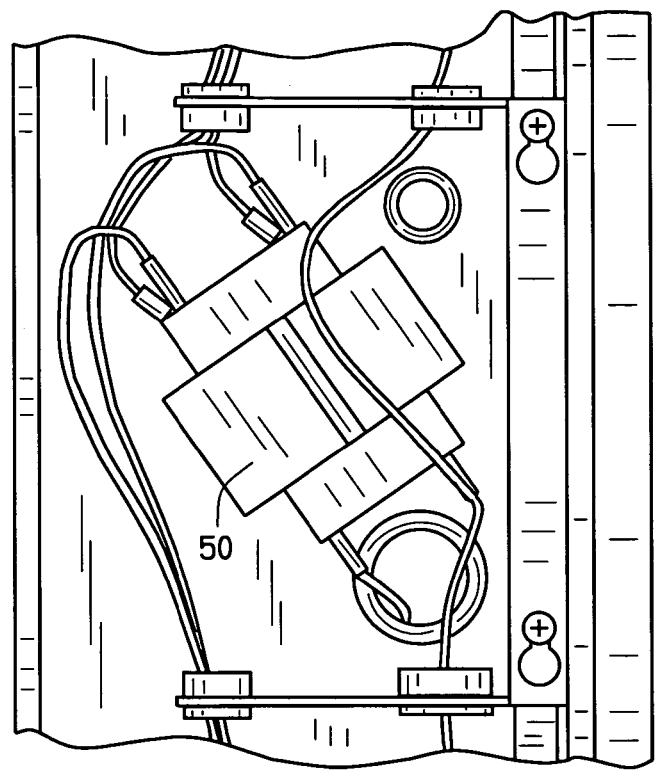
FIG. 22 is a front view of the upper portion of the brewer, with the front panel removed.

As can also be seen at the front of the brewer, as noted in FIG. 22, is a transformer 50 which normally operates from a 120 volt primary current, and reduces the voltage down to a 24 volt charge, for operations of the controls for the brewer. As can also be seen in FIG. 23, a sensor assembly, identified as a vessel detect, is shown at 51. As noted in FIG. 24, a switch assembly, micro switch, with a two pole connector, is provided at 52. A bracket means is furnished at 53 for holding this assembly.

The electrical terminal block 54 is noted in FIG. 23. 55 provides a label, terminal block. The electrical wires leading into the brewer are contained within the power cord assembly 56, and which connect with the terminal block, and it is designed to accommodate a 15 amp maximum power. Optionally, the brewer may also operate off of 240 Volts, 30 amps, in a variation upon the electrical operations of the device. A strain relief grommet, as at 57, is provided at the point of entry of the power cord, so as to prevent any pulling or tugging upon the wire from affecting any of the internal electrical components of the brewer.

At 59 is a bushing, to accommodate the entrance of the hose 39 therein.

The cover C for the brewer is formed of a cover assembly 60, a supplemental housing 60a, that includes a left side panel insert 61, and a right side panel insert 62, with the front panel with its various switches being provided at the front 43. The housing H is located below the cover 60, and it is integrated into the base S, formed of the base assembly 65 as can be noted. The sides of the housing may be decorated to add to its aesthetics. The base 65 is a molded base 66 and has channels 68 and 69 provided to either side, as can be noted. The base can be configured, as noted at 70, so as to accommodate the location of a decanter or beaker thereon, when a brewing cycle is in progress.

Underneath of the cover, as can be seen in FIG. 21, is the right side rail 71 and the left side rail 72 that accommodates the insertion and retention of the brew basket B, since the basket has a perimeter flange (not shown) provided around its periphery, and which can insert between the said rails, and the underside of the cover, as noted at 74, when the brew basket, laden with a filter and grounds, is inserted therein, in preparation for conduct of a brew cycle. The front panel, as noted at 73, is of a wave pattern, to add to the aesthetics of the brewer.

The basket B is more aptly disclosed as the basket assembly 77, as can be noted.

This generally describes the overall construction of the assembled brewer, as provided for acceptance of the programmable features of this development.

On Board Programming Instructions

The brew parameters for this current invention, and other of its features, requires the usage of a Palm or related computer, such as available from Palm, Inc., of Sunnyvale, Calif., which is normally identified as a hand held PDA with special application software to set up and modify the operations of this programmable brewer. In addition, it is likely that Blue Tooth capabilities may be incorporated into the programming of this brewer, at the desire of the customer. By design, this brewer has limited programming functions available. But, the onboard programming consist of calibration of the various water flow rates, the power mode selection, and maximum temperature set point. The selection of which of the internally stored brew profiles to activate is also possible although profiles may not be modified or added without the use of the PDA device.

The programmable brewer has four multi use buttons located on the front switch panel, as at 43, as previously explained. Three of the buttons are located to the lower left of the lighted display panel, and are labeled "1", "2" and "3" from left to right. These buttons are used for brewing during normal operations. For example, the various brewing profiles, are the myriad of options available for brewing different types of coffees, for example, within the apparatus, can be displayed upon the screen 43a, by depressing button number "1", for going through the profiles in advance, or by pressing button number "3", to advance downwardly in the display of the profiles upon said screen. Then, when a particular brewing profile is reached, to the selection and desire of the customer, button number "2" can be depressed for initiating a brewing cycle. Obviously, two buttons could be used for this feature, by simply scrolling in one direction through the various brewing profiles, and then selecting the brew button, when the precise type of brew is selected, for initiating a brewing cycle. The remaining button is on the right side of the display, and is labeled as hot water, upon the embodiment. This button is for dispensing of hot water through the faucet tube 28, during normal operation. On the right rear side of the brewer as previously reviewed at 49, and below the heat sink 47, is the switch that can be used to cycle power to the control board. This is necessary to enter into the various programming modes of the brewer.

The calibration of the programming mode is as follows. Although the brewer will have been calibrated at the factory, it may be necessary to make adjustments to the various parameters outlined previously, to accommodate factors specific to the location. Additionally, these steps will be required if a new control has been installed in the brewer, as when the brewer may have been repaired or serviced. The brewer should be plumbed in and connected to the electrical power supply, prior to beginning of this programming process.

The water calibration cycle allows measurement and setting of the volume of water delivered by the brewer within a specific time frame from various points of delivery. This assures that the volume delivered during operation will meet the programmed volume parameters contained in the brewing recipes. For hot water cycles, the brewer will heat to the proper temperature prior to dispensing.

Figure 28:
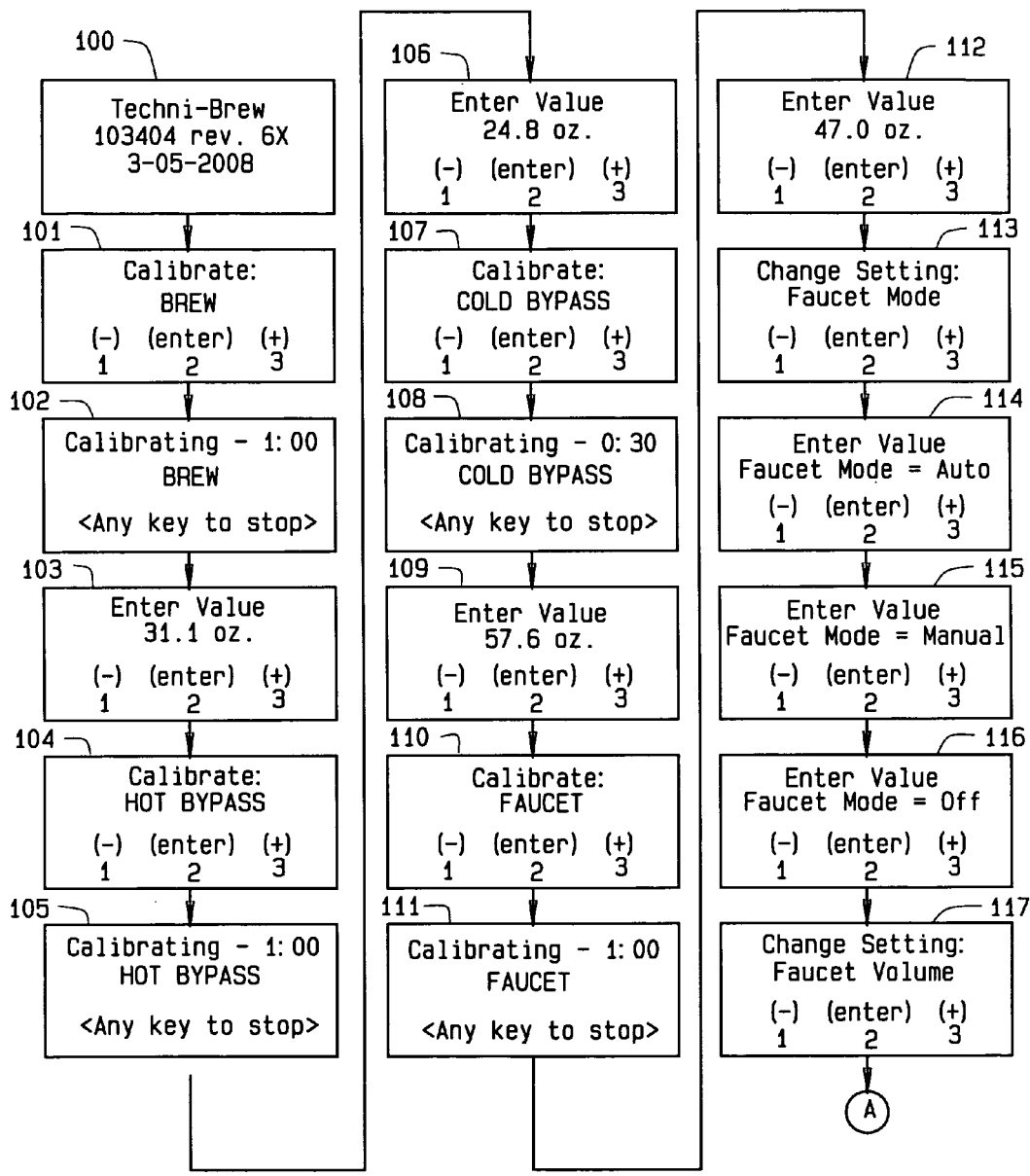
FIG. 28 shows the source code and operating code for the programmable functions that furnishes onboard programming for operations of the beverage brewer of this invention.
Figure 28:
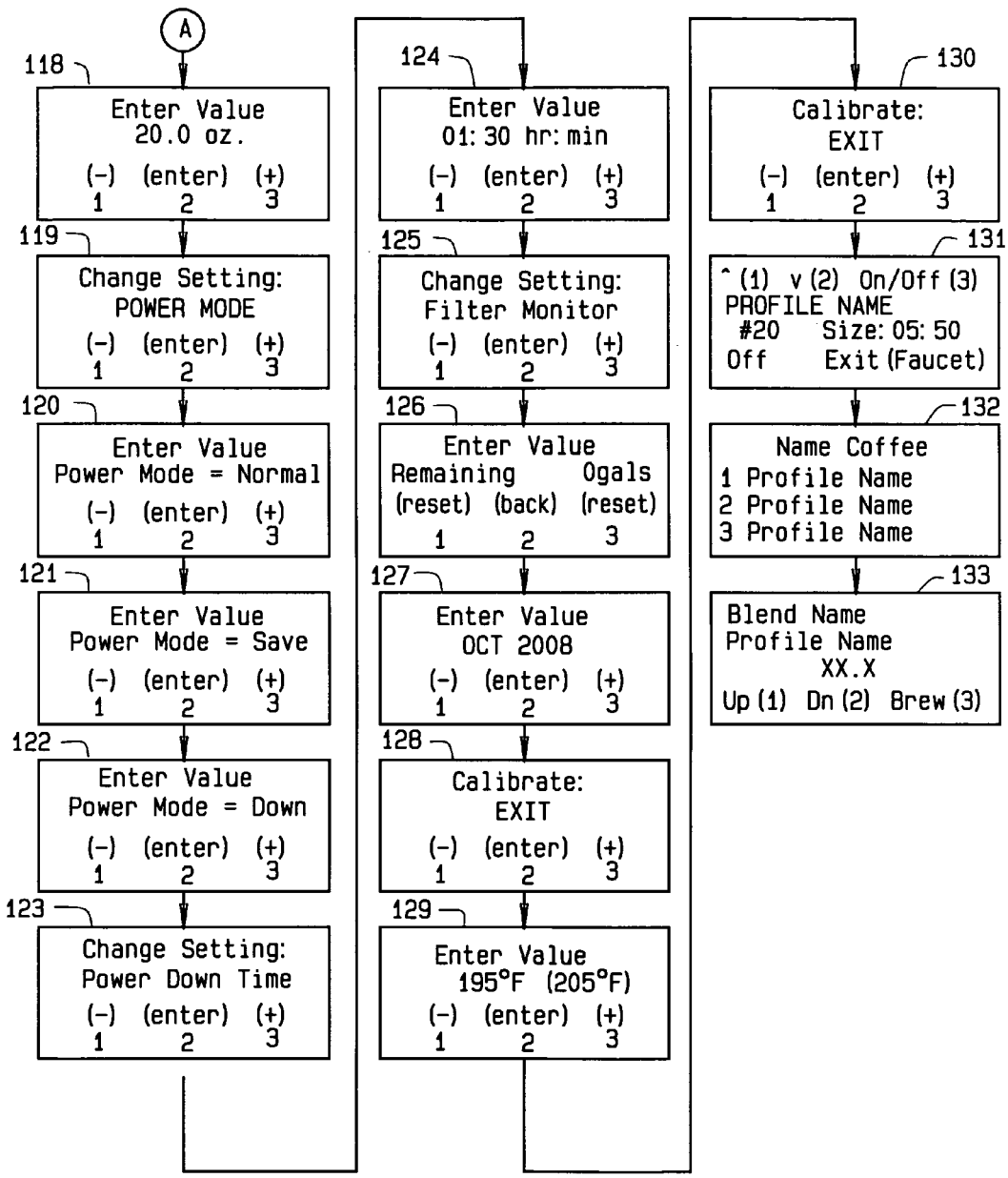

As can be seen in FIG. 28, the sequence of programming is readily identified.

The power up screen, displayed upon the PDA, is shown when programming is initiated. Then, to enter the calibration mode, as at 101, the switch off power switch 49 on the back of the unit is depressed, and one holds the hot water button while turning the switch back on. One continues to hold the hot water button until the first calibration screen, as shown at 101, appears for approximately five seconds.

The brew step of the calibration process is shown at 102. This process will measure and set the amount of water that is delivered through the spray head, during a brewing cycle. This water would be delivered over the coffee grounds in the brew basket during the coffee brew cycle. One places a suitable container below the spray head to collect the water to be dispensed. The brew basket may be inserted in the brewer if desired. Depressing of button number 2, or the middle button upon the front panel 43, begins the dispense cycle. The display will count down the remaining time for the cycle.

After the brewer has finish dispensing, and all of the water has drained into the container, one measures the volume of water that was delivered and programs the value into the brewer, as noted at 103. One uses the button "1", and the button "3", to set the volume display to match the volume delivered. This adjusts the volume either down, by depressing button number "1", or up, by depressing button number "3", to display the exact volume as delivered during the cycle. Then, one presses the number "2" button to enter the accepted value, when it has been properly and correctly set for volume of water as dispensed. Then, by depressing the button number "3", this advances to the hot bypass calibration step, as noted at 104. This step will measure and set the amount of water delivered through the hot water bypass outlet, located near the front side of the spray head. This water would be delivered in the bypass area of the brew basket on a coffee brew cycle, or into the tea brew basket when it sets on the tea dispenser for a tea brewing cycle. Then, one needs to set a suitable container below the outlet fitting to collect the water to be dispensed. This is noted at 105. One depresses the button 2 to begin the dispense cycle. The display will count down the remaining time for the brew cycle. After the brewer has finish dispensing, and all water has drained into the container, one measures the volume of water that is delivered. Then, one programs this value into the brewer using the steps as previously outlined above, as can be noted at 106. One then depresses the button "3" to advance to the cold water bypass calibration step. This is set forth at 107. This step will measure and set the amount of water delivered through the cold water bypass tube located at the left rear side of the brew zone, as previously noted at 29. This is water that will be delivered into an ice tea container, during a tea brew cycle. Then, one needs to place a suitable container below the tube 29, to collect the water to be dispensed. This step is provided at 108. One then depresses the button "2" to begin the dispensing cycle. The display will count down the remaining time for cold water dispensing. After the brewer has finished dispensing, and all water has drained into the container, one measures the volume of water that was delivered. This is then programmed as a value into the brewer using the steps outlined above. See 109.

One then depresses the button number "3", on the front panel, to advance to the faucet calibration step. This is noted at 110. This step will measure and set the amount of water delivered through the hot water dispense tube, as at 28, located at the right rear side of the brew zone of the device. This water can be used for various purposes such as for making hot chocolate, cocoa, or hot tea. One places a suitable container below the hot water tube to collect the water being dispensed. This is noted at 111. One depresses the button "2" to begin the dispense cycle. The display will count down the remaining time for hot water dispensing. After the brewer has finish dispensing, and all water has been drained into the container, one measures the volume of the water that was delivered, as at 112. This value is programmed into the brewer, using the step outlined above. This concludes the water calibration process for the brewer.

The next step is to change the setting of the faucet mode, as noted at 113. The operator needs to depress the button "3" on the front panel to advance to the faucet mode selection step. This step allows selection of one of the three operation modes as to be subsequently described. One needs to depress the button "2" to choose the operation mode, as at 114. The mode displayed is the current brewer setting. The automatic mode causes a preprogrammed volume of hot water to be dispensed from the hot water dispense tube, the faucet, each time the faucet button is depressed. The use of buttons "1" and "3" to select a different mode if automatic dispensing is not desired, is noted at 115. The manual mode will dispense hot water only for as long as the faucet button is depressed. This is useful for variable dispense amounts and corresponds with traditional mechanical faucet operations. The off mode, as at 116, allows the faucet to be disabled for locations where it is not desirable to allow dispensing of hot water. The faucet button will be inactive. To set the dispense volume, as the faucet volume, this insures that the automatic dispense is displayed as the faucet mode and is initiated through depression of the button number "2", as noted at 117. One will see displayed upon the PDA screen the volume setting as noted herein. If no change is desired, then one simply depresses the button "3" to advance to the next selection option. One then needs to depress the button number "2" to review or change the volume setting, as noted at 118. The use of buttons "1" and "3" to lower or raise the displayed value can be performed. Once the desired dispense volume is displayed, one only needs to press the button "2" to confirm the setting of that value. This will then return the operator to the previous screen.

When one depresses the button number "3", at this stage, the programmable features are advanced to the power mode setting of the screen, as noted at 119. This step allows the selection of the heater power mode. One depresses the button "2" to allow selection of the power mode. In the normal power mode, the tank temperature is maintained at the set point as determined by the active brew profile with the lowest set point. This is noted at 120 during the programmable mode. This set point will be maintained during the idle mode. One then depresses the button "2" to select the normal power mode. In the power save mode, the tank temperature will be regulated as noted in the normal mode until a specified period of inactivity has elapsed. This can be noted at 121. Once this power down time has elapsed with no brew activity, the temperature set point is lowered to 170° F. One needs to depress the button "2" to select the power save mode. In the power down mode, the tank temperature will be regulated as noted in normal mode until a specified period of inactivity has elapsed. See screen 122. Once this power down time has elapsed with no brew activity, the tank element is shut off. One depresses button number "2" to select the power down mode. The desired period of inactivity is set in the power down time setting screen, as noted at 123. This screen will only display if either power save or power down has been selected as the power mode. One advances to this screen by depressing button "3" after selecting one of these two modes. One depresses button "2" to select the power down time mode. The use of buttons "1" (down) and "3" (up) to set the inactivity period before set back/shut down is the next step. This is noted at 124. One presses button "2" (enter) to accept the value established, when it is set correctly. This will return the operator to the previous screen. Then, one depresses the button "3" to advance to the filter monitor screen, as noted at 125. This screen allows access to a couple of water filter settings, as to be noted in the following sections. One depresses the button "2" to enter the filter volume monitor and reset the screen as noted at 126. The remaining filtering capacity of the installed water filter (if applicable) will be displayed. Depressing button "2" will take one back to the previous screen with no change to the value for volume remaining. Depressing buttons "1" or "3" will reset the filter volume to the same capacity of the filter last installed, as recorded in the brewer's memory.

If the filter was reset, the filter change date screen will be displayed, as at 127, when the button "2" is pressed. Enter the anticipated month and year to change the filter using the buttons "1" and "3". The brewer does not use this value to indicate when to change a filer, but relies upon the actual water used. This is only used as a reference for service personnel. One uses button "2" to confirm value and exit to filter monitor screen. One depresses the button number "3" to advance to the calibration exit screen. This is noted at 128. Depressing the button "2" will exit the system while depressing and holding button "2" (5 seconds) will allow one to calibrate the boiling point based on the location of the brewer, and adjust to the maximum temperature set point value accordingly. The next screen, as at 129, is where the maximum temperature set point value is entered. The value is calculated as soon as the screen is entered and is displayed to the right in parentheses. The value at the left is the current set value. Use of buttons "1" (down) and "3" (up) are manipulated to set the value to the recommended value. It is not advisable to set the value higher than the recommended value for the brewer. Then, one depresses button "2" to enter your selection and use button "1" to back up to the exit screen, as noted at 130. One depresses button "2" to exit the calibration programming mode.

At this stage, one can establish the brew profile activation program mode. The programmable brewer can hold up to 250 brew profiles for a variety of brewed beverages. This mode is used to set the activation status dependent on the products and volumes to be brewed at a specific location. The selection must be made from among profiles that already exist within the brewer. The PDA with the proper software application may be used to modify existing profiles or to add new ones. The PDA may also be used to set activation status. To enter the profile activation mode, as noted at 131, the switch off power switch on the back of the unit, as at 49, is depressed, and one should hold any one of the brew buttons ("1", "2", or "3") while turning the switch back on. One should continue to hold the button until the first activation screen is shown, as noted at 131, for approximately 5 seconds. Lines two and three will look different on the screen on your machine. The top line is simply indicating the function of buttons "1"-"3" while in this mode. "1" equals scroll up, while "2" equals scroll down, and "3" toggles the profile on or off. The bottom line indicates whether the profile is on or off on left and notes use faucet (hot water) button to exit. Line two shows the profile name for the establishment, and line three shows the profile number as well as the pack size of the coffee or tea. Use the buttons to scroll through the available profiles and insure that the on/off setting meets the requirements for the location. When this is done, one exits the mode.

Finally, the onboard brewer programming is now complete. One of the remaining screens will show the name of the establishment, as noted at 132. One should see the screen as noted at 132, and no more than three profiles have been set to be active, as noted in lines two-four. If more than three profiles have been set to be active, the screen will be similar to what is shown at 133. The line one-three will vary for each brew profile, the bottom light is simply indicating the function for the buttons "1"–"3". "1" and "2" scroll up and down the list of active profiles in the brewer, and "3" initiates the displayed brew cycle.

This provides a detailed summary of the onboard programming of the programmable brewer, through the use of a hand held computer, or PDA, in setting up the brewer for various brew cycles. As commented, the programmable brewer, of this design, has been developed to hold up to 250 brew profiles for the variety of brewable beverages that can be obtained from this device.

Description of a Circuit Diagram

Figure 27:
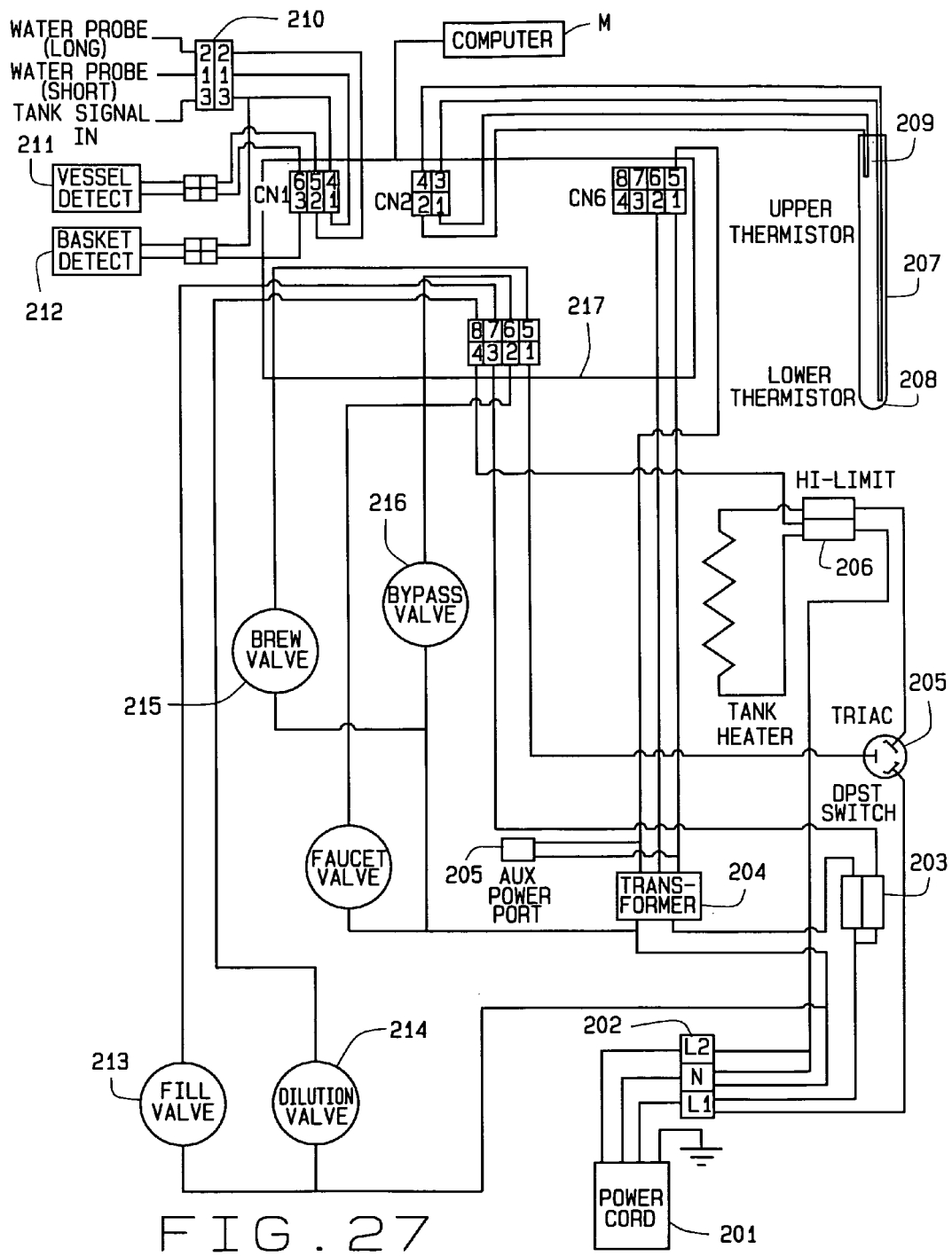
FIG. 27 shows the wiring diagram for the electrical and electronic components providing electrical operations to the programmable brewer of this invention.

In referring to FIG. 27, of the application, therein is shown the circuit diagram for the electrical operations of this programmable brewer. In addition, it discloses the various computer chip that are embodied within this structure to provide for the programmable operations of the brewer, once its parameters have been calibrated either at the factory, or through the usage of a hand held computer.

As noted, the circuitry includes a power cord 201 that conducts either high voltage (120 or 240 V ac) electrical power to the brewer cabinet or housing. A terminal block 202 serves as junction point between the internal wiring of the brewer, and the exterior power supply. A power switch 203 breaks the electrical circuit to the transformer 204 and the conduct of high voltage to the control board. This allows a method requiring deliberate intent to enter into various brewer programming modes (which requires that both certain keys be depressed on the face of the brewer while simultaneously switching on brewer power), all as previously reviewed in this application. The switch, which is a double pole single throw switch, also allows the unit to be easily powered off if it is to be left unattended for extended periods of time. The transformer 204 provides a means to step down the high voltage power, as previously reviewed, to a lower voltage, for use in certain and select parts of the circuitry, such as the water level probes and the temperature sensors. This also provides power for an auxiliary power port.

The auxiliary power port 205 provides a method for connection of low voltage supplementary equipment, such as a ground coffee dispenser, to enhance the utility of the brewer. The use of low voltage power allows placement of another piece of equipment without using another electrical receptacle, since these are often at a premium in a restaurant, c-store, or similar environment of usage.

A triac 205 provides a rugged, high life cycle method of cycling power to the tank heater, as noted at 206, and this allows a method to tailor the effective wattage of the tank heater through quick electrical pulses to very accurately controlled characteristics of the heating cycle. A Hi limit thermostat, at 206, serves as a back up to protect the heating system from a component failure that would cause the heater to run on after the desired tank temperature has been reached. The Hi limit is a mechanical bi-metal thermostat that will open the electrical circuit if over heating occurs.

The tank heater 206 incorporates its heating element, and is designed to run off of the 120 Volt or 240 Volt AC power, allowing connection to either power supply without changing of components. The element heats the water required for the brewing process. The thermistors, as noted at 207, including a lower thermistor 208 and an upper thermistor 209 monitor the water at multiple points in the tank and provides inputs to the control board so that it can throttle the power to the tank element to deliver the desired heat at the desired point in time.

The upper probe, 209, is monitoring water at the delivery point while the lower probe, 208, is monitoring the water near the heater.

The water level probes 210 control the water level entering into and existing in the heater tank. There is an upper probe and a lower probe, and the probe that is used for filing the tank is dependent on the temperature of the water in the tank. The lower probe will be the stop for water when the water is below a certain temperature threshold. Once heated to a desired level, the upper probe will become the regulating probe and the lower probe will serve as a backup. This gives the brewer the ability to compensate for the normal water expansion in the system that accompanies the rise in temperature. This both allows for more accurate and consistent water delivery as well as prevents any dripping that may occur in a normal system.

A vessel detection sensor 211 is a non contact reed switch that is actuated by a magnet mounted to vessels of a certain size. This ensures that a vessel of a certain size and type is present to receive the brewed beverage, during performance of a brewing cycle. This sensor can also stop water delivery and sound a warning if a brew basket is removed prematurely during a brewing cycle.

There is also included within the circuitry an RF antennae, which is not shown, and the antennae is provided for receiving an RF signal from a container which allows for further refinement of the vessel detection as noted above. This can assure that not only the right volume is brewed, but can also match a flavor to a particular container to prevent cross contamination or ensure that decaf is brewed into the vessel labeled for decaf. A further use of this technology is to track how old a brewed beverage in a particular container is by tracking time since the container was last brewed.

The basket detection 212 is applied to indicate that the correct basket for the brew cycle chosen is present, and properly located. It can also stop water delivery and sound a warning if the brew basket is removed during a brew cycle.

A fill valve, as at 213, is provided for replenishing water dispensed from the hot water tank, as through the brewer sprayhead. A dilution valve 214 is provided for supplying cold water to the beverage container to mix with the brewed concentrate to provide for a completed beverage, such as an iced tea. Further provided is a brew valve 215, and this provides hot water for dispensing through the brewer sprayhead and over the coffee grounds, or other product located in a receptacle below the sprayhead, to provide all or just the concentrated portion of a brewed beverage. A bypass valve 216 is used as a brew valve (as noted above) when it is desirable to use an alternate method of distributing the hot water over the beverage, rather than the sprayhead as noted previously. For instance, to brew iced tea a special receptacle with an integrated hot water diffuser is place directly on top of the beverage container. The tea leaves are placed in the basket and the vessel is put in place on the brewer base. When the brew cycle is started, the hot water is delivered to the tea basket. A second use for the bypass valve is to allow some portion of the hot water that would normally be passed over the coffee grounds to be diverted around the product and subsequently mixed with the brewed concentrate to yield a finished beverage. This can minimize or eliminate the effects of over extraction that may occur by pass all hot water over the grounds, greatly improving the beverage flavor and quality. The timing of the delivery throughout the brew cycle can be varied in near infinite combinations which alter the characteristics of the brewed beverage. A bypass volume of 20% can deliver many different brewed product flavors depending on how the timing of its delivery is combined with that of the brew valve.

Also noted in the circuit diagram of FIG. 27 is the control board 217, and which contains the various chips CN1-2-6, etc., that receive the input and store the various brew profiles that are inputted from the computer M, which, as described, may comprise a Palm computer, Blue Tooth, or other computer PDA that is used to input special software applications to modify the configurations or settings of the brewing profiles, that are stored within the control board 217, and its operative components.

A faucet valve, as previously reviewed in the preferred embodiment, is a faucet valve that allows delivery of hot water for additional uses, such as cooking or making other beverages, such as hot chocolate, cocoa, or the like. The faucet valve can be set to deliver a preset volume, to run as long as the switch is held, or tuned off, for maximum flexibility. The physical structure of the faucet tube may be quickly removed or installed without tools. It is a pressure fit.

The specific description of the control board features follows hereinafter. Although the coffee brewer incorporates a number of advanced features for ultimate brewing performance, the overall brewer operation remains essentially the same. That is, the use of a tank, the heating of the water, its siphoning through a sprayhead for conducting a brewing cycle. This particular description herein describes the various features of this programmable brewer, as managed by its control board. Many of the features incorporate in the structure of this brewer require the use of a Palm or other computer PDA and a special software application to modify configurations or settings. Communication with the Palm application occurs via its IR. Customizable recipes may be created, to suit any need of the consumer. By varying setting such as brew time, temperature, and bypass parameters, a custom profile can be created to maximize the beverage quality for any brewable product. A profile storage, for a storage of up to 250 different brewing profiles, with the right combination of brewing parameters, is just a selection away by the consumer. Any combination of stored profiles may be activated on the brewer making the selection as limited or as diverse as required by a specific location. Selection flexibility is also built into this brewer. Two methods of beverage recipes selection for brewing are available depending on how many profiles are active. If three or less profiles are active, the display designates a specific profile to each of the three brew buttons. If more than three profiles have been activated, the display advises the user to use to use appropriate buttons to scroll through the available selections until the one desired is displayed. By simply pushing the button "3" activates the brew cycle. When the brew cycle is activated, what is identified as the autoarm provides the water temperature at the dispense point to be checked, to ensure it is correct for the selected beverage profile. If the water temperature is below the water temperature set point when the brew cycle is initiated, the water delivery portion of the brew cycle is delayed. The display flashes a preparing to brew instruction, as the temperatures adjusted accordingly. When the tank reaches the preset temperature, the brew cycle will resume. The brew indicators, a red neon light is lit, and a display flashes preparing to brew, to indicate that a brew cycle has been activated. Once the dispense portion of the brew process has begun, the display begins to count down the time remaining for the completion of the brew process. A visibrew feature is presented, and it provides the amount of time for the brew basket to finish draining after the water delivery portion of a brew cycle varies depending on the number factors, such as the product type, coarseness of grounds, filter paper, etc. visibrew allows an additional amount of time to be added to the end of the brew cycle to aid in preventing premature removal of the brew basket or beverage container. The red neon will continue to glow, the display count down time will be extended, and the audible alert will be delayed by this amount. This can be individually set for each profile. The neon light is provided on the front panel, as at 218. An audible alert feature is also provided, as previously explained. The audible indicator signals when the brew cycle has been completed. Additionally, and audible warning indicates when a brew basket is removed prematurely on the coffee cycle. The alert will also sound if one of the larger vessels, such as a 1.5 gallon coffee or a 3 gallon tea container are removed. A coffee basket detect is also built into the structure of this brewer, as previously explained. The basket detection sensor helps to ensure that the coffee basket is in place for a coffee brew cycle, and not in place for an iced tea brew cycle. A coffee brew cycle cannot begin without the basket in and the tea cycle cannot begin with a basket in place. The display prompts the user to ensure that the tea basket is in place on the dispenser during an iced tea brew cycle, but there is no tea basket detection. The vessel detect is also provided. A vessel detection sensor helps to ensure that for large vats brewing, a large container is in place. This feature helps to prevent or minimize spillage due to an inappropriate sized container being in place. Either a 1.0 or a 1.5 gallon coffee, or a 3 gallon iced tea container, satisfies the brewer. A pulse heating is also provided. As the temperature in the tank closes on the set point, the tank heater will begin to pulse. This pulse heating allows the brewer to reach the set point without over shooting as would occur in a normal heating system. It also allows the water in the tank to reach a more uniform temperature. If the set point is exceeded pulsing will stop all together. Filter tracking is also provided. This feature uses the flow rate of incoming water along with the programmed filter capacity to calculate the volume of water that has been filtered and the remaining filter life. The brewer will prompt the user when the filter is nearing the end of its rated capacity. A separate warning will indicate that the filter has reached or exceeded this limit. A water filter is also provided. This type of filter, which may be optionally installed, on the brewer may be selected on custom filter settings may be programmed in. an appropriate date to change the filter may be programmed in as well, as well as the actual date install and the installers name. the brewer will then track water usage and first prompt the user to change the filter soon and later to change the filter now based on the filter capacity. A cycle counter is provided. The total number of brew cycles as well as hot water dispense cycles started is tracked within the brewer. A new brewer may have one or more cycles registered due to unit testing at the factory. Serial number tracking for the brewer may also be provided. The brewer serial number may be programmed into the control board to provide easy access to service personnel. Each control board has a unique serial number that is stored internally and is not changeable and is logged to a particular brewer, if applicable, at the factory. The pulse brew mode is provided. This mode cycles the brew valves on and off during the brew cycle. This slows the entry of cold water into the tank and minimizes the mixing action caused by introducing a large volume of cold water into the tank at one time resulting in an increase of brew temperature. The additional turbulence and mixing created in the brew basket along with the increased temperature can result in higher extraction rates for the coffee. pulse brewing is enabled automatically when a profile is created or modified if the brew time entered exceeds the brew time required based on the valves flow rates. Power mode allows one to automatically save energy when the brewer is not in use for a length of time as specified under power down time. The available mode modes are normal, power save (standby), and power down. These modes are described herein. The normal mode is the mode the tank temperature will be maintained at the lowest of the preset temperatures in the active brew profiles at all times. The power save, or standby mode, is the mode that tank temperature will be maintained at approximately 170°, when the power set down time has been reached. The power down mode is the mode the tank heater element will be disabled when the set down time has been reached. By depressing a brew start switch, or by turning the power back on by cycling the on/off switch, the timer is reinitiated, and the set time frame starts over. In standby and power down modes, the auto arm feature will bring the tank up to the preset temperature before brewing when a brew switch is depressed. The power down time feature is used to set a specified length of time ranging before the standby or power down modes will take affect.

For the initial set up of this programmable brewer, once the brewer is connected to water and electrical supplies it is ready to operate. Although the brewer is calibrated at the factory, it is recommended that the user perform the procedures outlined previously for onboard programming, to verify the flow rates, the maximum temperature set point, and the energy modes required for installation location.

The appropriate set of brew profiles, brands and messages should be loaded into the brewer, as previously explained. The profiles that will be used should be activated using either the brew controls or the Palm profiler application. To activate existing brew profiles using the brewer controls, this can be done through the onboard programming as instructed. The Palm and profiler application may be used to set the proper water filter size and reset the volume counter if applicable. The hot water button should also be set to the proper dispense mode, or disabled as desired, and is previously reviewed.

To begin a coffee brew cycle, to verify that the brew basket recognition feature is working, one starts a brew cycle, pulls the basket out about an inch and the brewer should prompt as to whether the basket needs to be replaced. Reinstall the basket fully and the brew cycle should continue. Or, if something is wrong with the operations, the brew cycle will be cancelled.

If the brew cycle has been activated that requires either the large coffee or the tea container, check that the vessel detection feature is working. To do this, begin a brew cycle that requires the larger vessel without the vessel fully in place. The screen should prompt for the vessel and when the vessel is set in place should allow the brew cycle to begin. If the vessel is pulled forward about an inch or so from the brewer, it should sound an alarm and prompt the vessel to be replaced.

To brew a beverage, one places the proper sized coffee filter into the coffee basket. One adds the appropriate amount of coffee to the filter for the profile being used for brewing. One slides the coffee brew basket fully into place on the brew rails. To ensure that the appropriate beaker or container is centered on the base below the brew basket, this is done by visual inspection. One selects the proper button number for the profile to be brewed, if three or less brew profiles are activated, use of buttons "1" or "2" to scroll through the available profiles for brewing, if more than three brew profiles are activated, one does this until the profile desired is displayed. Then the use of button "3" is initiated to begin the brew cycle. Hot water will be delivered through the spray head. This distributes the hot water evenly over the coffee grounds within the brew basket. Some brew profiles may route a portion of the hot water around the filter to achieve a certain taste profile. The coffee brewed will drain from the brew basket into the decanter below. To clean the brew basket simply remove it from the brew rails and dump the filter into a waste container. The brewing process, as described above, is completed, and now can be restarted again.

Other beverages can be brewed accordingly, as per the programmed profile for this brewer. Hot tea can be brewed, iced tea can be brewed by dispensing through the cold water faucet, or hot chocolate can be brewed by dispensing from the hot water tube, a previously explained.

Variations or modifications to the subject matter of this invention may occur to those skilled in the art upon review of the invention as summarized herein, and as described in the preferred embodiment. The depiction of the invention within the drawings, and the sequence of screens as presented during the setup and operations of the programmable brewer are set forth for illustrative purposes only. Any variation or modifications thereto, within the scope of this invention, are considered to be encompassed within the scope of the claims set forth.

We claim:

1. A programmable brewer including a beverage brewing apparatus for use for brewing the type of brewed beverages including coffee, tea, hot chocolate, or other type beverages, said brewing apparatus incorporating a housing, said housing having a water heating tank, a base, said housing integrated into the back of the base for providing support, said base designed for supporting a decanter or beaker for a beverage brewing cycle, a cover, said cover attached to the top of the housing, and said cover cantilevered forwardly therefrom, a brew basket provided upon said cover, a spray head integrated into the forward portion of the housing cover, and fluid flow lines provided for delivering water from the housing and said heating tank to the sprayhead for delivery of a select quantity of a predetermined temperature of water during the performance of a brewing cycle;

a computer means operatively associated with the brewer, said computer means provided for establishing a variety of brew parameters for the brewer during a brewing cycle, said computer means provided for calibrating a amount of heated water delivered through the sprayhead during a cycle, said computer means provided for calibrating the range of temperature of the water heated within the water tank for delivery through the sprayhead during a brewing cycle, said computer means provided for inputting of the myriad of brewing parameters for the beverage to be brewed, said computer means provided for controlling of the brewing parameters, said brewing parameters displayed, on the front of the housing cover, a control panel assembly provided within the brewer an operatively associated with the computer means and storing the myriad of brewing parameters inputted into the brewer from the computer means, at least one button provided upon the brewer for selecting the type of beverage to be brewed, and at least another button provided upon the brewer for actuation when a brew cycle has been selected, and is to be initiated by a user.

2. The programmable brewer of claim 1 and including a panel provided upon the front of the housing cover, a control panel provided proximate the panel of the housing cover, switches operatively associated with the control panel and disposing said series of switches for cooperating with said computer means to regulate the temperature of the hot water heated within the hot water tank, and the quantity of hot water dispensed through the spray head during a brewing cycle.

3. The programmable brewer of claim 2 and including select of said switches cooperating with the computer means to determine the quantity of cold water to be delivered through the cold water tube during operations of the programmable brewer.

4. The programmable brewer of claim 2 and including a portion of said control panel observable as a screen through the panel provided at the front of the housing cover.

5. The programmable brewer of claim 1 wherein a cold water dispenser and a hot water dispensing tube operatively associated with the housing, for delivering a quantity of cold water or hot water respectively through said dispensers during usage, and said computer means provided for establishing the quantity of cold and hot water delivered through their respective dispensers during usage, said hot water dispensing tube being pivotal laterally to facilitate the delivery of hot water to a cup during brewing of a beverage.

6. The programmable brewer of claim 2 wherein said computer means capable of establishing up to 250 brew profiles for a variety of beverages to be brewed from the programmable brewer during usage.

7. The programmable brewer of claim 6 wherein select of said switches provided upon the control panel at the front of the housing cover are selectable for determining one of the profile of brewed beverages and a quantity dispensed during a brewing cycle.

8. The programmable brewer of claim 7 wherein said switches upon the housing cover being actuatable and in combination with the computer means providing for a modification to existing brew profiles selectable to be brewed by the programmable brewer during usage.

9. The programmable brewer of claim 8 wherein a hand held computer may be used in combination with the brewer to provide for the establishment of the brew profiles for the variety of brewed beverages that may be obtained from the programmable brewer during usage.

10. The programmable brewer of claim 1 and including rails provided along the underside of the housing cover to provide for accommodation of a brew basket during brewing of a beverage.

11. The programmable brewer of claim 10 wherein the side walls of the cover being ventilated to provide release of heat from the housing during usage.

12. The programmable brewer of claim 10 wherein the back of the housing having vents to provide for ventilation of heat during operations of the programmable brewer.

13. The programmable brewer of claim 1 and including a supplemental housing provided upon the back of the cover for housing miscellaneous electrical components for use for operations of the brewer during conduct of a brewing cycle.

14. The programmable brewer of claim 1 and including circuitry within the brewer for cooperating with the computer means to provide for calibration of the programmable brewer, and including a triac, within said circuitry, that provides for tailoring the effective wattage of the tank heater through quick electrical pulses to very accurately control the characteristics of a heating cycle for the brewer.

15. The programmable brewer of claim 1 and including circuitry within the brewer for cooperating with the computer means to provide for calibration of the brewer for usage, and including said circuitry incorporating a hi-limit thermostat, to protect the heating system from component failure that would cause the heater to run on after the desired tank temperature has been reached.

16. The programmable brewer of claim 1 and including circuitry within the brewer for cooperating with the computer means to provide for calibrating of the said brewer, a control board and including two thermistors operatively associated within the circuitry to monitor water within the tank at multiple points and provide inputs to the control board that throttles the power to the tank element to deliver the desired heat at the desired point in time during a brewing cycle.

17. The programmable brewer of claim 1 and including a fill valve within the housing and incorporated within the water supply means to the brewers water heating tank, said fill valve provided for replenishing water dispensed from the hot water tank, and a dilution valve, said dilution valve provided for supplying cold water to the brewer housing to mix with the brewed concentrate to provide for a completed beverage such as an iced tea.

18. The programmable brewer of claim 17 and including a brew valve within the housing, said brew valve provided for delivering hot water for dispensing through the brewer sprayhead and over any coffee grounds within the brew basket to provide for brewing of the desired beverage.

19. The programmable brewer of claim 1 and including circuitry within the brewer for cooperating with the computer means for establishing the brew parameters of the brewer during usage, said brewer including a profile storage means within its circuitry, that stores up to 250 different brewing profiles for selection by the user when brewing select beverages.

20. The programmable brewer of claim 1 and including a brew indicator operatively associated with the cover and capable of illumination to indicate when a brew cycle has been activated.

21. The programmable brewer of claim 20 and including a coffee basket detect within its structure to indicate when a brew basket is in place for a coffee brew cycle, a vessel detect, operatively associated with the base, to detect when a beverage container is in place for brewing of a beverage, and a pulse heating means, operatively associated with the water heating tank, to provide for pulsating of the tank heater to achieve a precise upper set point for heating of the brewer water within its heating tank during operations of a brewing cycle.

22. A programmable brewer as set forth in claim 1 and including circuitry to cooperate with said computer means for establishing the brew parameters for the brewer, and including a cycle counter, within the circuitry, to count the number of brew cycles performed by the brewer during usage, and a filter tracking means, to determine the remaining life of a filter after repeated usage.

23. The programmable brewer of claim 1 and including further buttons provided on the control panel, the at least said one buttons provided for advancing the brewing parameters displayed on the front of the housing cover, and the further button provided for reversing the display of brewing parameters until a beverage profile is selected, at which time the another button is actuated for initiating a brewing cycle as selected.

* * * * *